United States Patent [19]

Ide et al.

[11] 4,035,443
[45] July 12, 1977

[54] POLYVINYL CHLORIDE RESIN COMPOSITION HAVING TRANSPARENCY, HIGH GLOSS, IMPACT AND WEATHER RESISTANCE

[75] Inventors: Fumio Ide; Kazuo Kishida; Jinpee Kobayashi, all of Ohtake, Japan

[73] Assignee: Mitsubishi Rayon Co., Ltd., Tokyo, Japan

[21] Appl. No.: 644,421

[22] Filed: Dec. 24, 1975

[30] Foreign Application Priority Data

Dec. 27, 1974 Japan .......................... 50-148851

[51] Int. Cl.$^2$ ................ A43B 13/04; C08L 51/06; C08F 6/24
[52] U.S. Cl. ................ 260/876 R; 260/23 XA; 260/23.7 M; 260/23.7 R; 260/890; 260/892
[58] Field of Search ...... 260/876 B, 876 R, 23.7 R, 260/23.7M, 23 XA, 890, 892

[56] References Cited

U.S. PATENT DOCUMENTS

| | | | |
|---|---|---|---|
| 3,644,249 | 2/1972 | Ide et al. | 260/876 R X |
| 3,651,175 | 3/1972 | Ide et al. | 260/876 R |
| 3,678,133 | 7/1972 | Ryan | 260/876 R |
| 3,793,406 | 2/1974 | Bortnick et al. | 260/876 R X |
| 3,833,686 | 9/1974 | Grochowski et al. | 260/876 R |
| 3,842,144 | 10/1974 | Tanaka et al. | 260/876 R |
| 3,843,753 | 10/1974 | Owens | 260/876 R |
| 3,879,494 | 4/1975 | Milkovich et al. | 260/876 R |
| 3,882,198 | 5/1975 | Miller | 260/876 R X |
| 3,886,232 | 5/1975 | Tanaka et al. | 260/876 R |
| 3,899,547 | 7/1975 | Amagi et al. | 260/876 R |
| 3,928,500 | 12/1975 | Kraft et al. | 260/876 RX |
| 3,943,190 | 3/1976 | Abe et al. | 260/876 R |
| 3,959,895 | 6/1976 | Lonning | 260/876 R X |
| 3,969,431 | 7/1976 | Gallagher | 260/876 R |
| 3,971,835 | 7/1976 | Myers et al. | 260/876 R |

Primary Examiner—Murray Tillman
Assistant Examiner—T. De Benedictis, Sr.
Attorney, Agent, or Firm—Armstrong, Nikaido & Marmelstein

[57] ABSTRACT

A transparent vinyl chloride resin composition excellent in surface gloss and resistant to weathering and impact, comprising 97 to 60 parts by weight of a vinyl-chloride polymer and 3 to 40 parts by weight of a graft copolymer (B) obtained by emulsion-polymerizing a mixture of an aromatic vinyl monomer and a polyfunctional crosslinking agent having at least one allyl group, then polymerizing, in the presence of the resulting polymer latex, a mixture of an alkyl acrylate having 2 to 10 carbon atoms in the alkyl group and a polyfunctional crosslinking agent having at least one allyl group to form an acrylic elastomer (A) in the first stage the proportions of said alkyl acrylate and said aromatic vinyl monomer being 50 to 70% by weight and 50 to 30% by weight, respectively, and the amount of said crosslinking agent used being 0.1 to 5 parts by weight in total per 100 parts by weight of the sum of said alkyl acrylate and said aromatic vinyl monomer; and graft-polymerizing, in the presence of the resulting acrylic elastomer (A), first methyl methacrylate and subsequently an aromatic vinyl monomer in the second stage, the proportions of said methyl methacrylate and said aromatic vinyl monomer being 30 to 80% by weight and 70 to 20% by weight, respectively, and the total amount of said methyl methacrylate and said aromatic vinyl monomer used being 70 to 20 parts by weight per 30 to 80 parts by weight of said acrylic elastomer (A).

5 Claims, No Drawings

POLYVINYL CHLORIDE RESIN COMPOSITION HAVING TRANSPARENCY, HIGH GLOSS, IMPACT AND WEATHER RESISTANCE

This invention relates to a vinyl chloride resin composition excellent in surface gloss as well as in transparency, weather resistance, and impact resistance.

Although widely used as a general-purpose resin, the vinyl-chloride resin (hereinafter referred to as PVC) is not entirely satisfactory in physical properties. When used alone, it is satisfactory in transparency, but insufficient in impact strength. To improve the impact strength, there have been proposed various modifiers to be blended with PVC, such as, methyl methacrylate-butadiene-styrene (MBS) resin, acrylonitrile-butadiene-styrene (ABS) resin, ethylenevinyl acetate (EVA) resin, and chlorinated polyethylene resin. The resulting compositions, however, are deteriorated in transparency, and weather resistance, though improved in impact strength. As a method for improving weather resistance as well as impact strength, there has been proposed a resin comprising a crosslinked acrylic ester as an elastomer component. In order to further improve the impact strength, it has been proposed to use an elastomer having a double layer structure with an outer shell of an acrylic ester, the core thereof being a polymer having a high glass transition temperature. There has been known a resin obtained by the graft polymerization of vinyl chloride, styrene, methyl methacrylate, or acrylonitrile in the presence of the said crosslinked double layer acrylic ester elastomer. These compositions are injured in transparency of PVC, though improved in weather resistance and impact resistance. For the purpose of improving transparency and impact strength, U.S. Pat. No. 3763279 discloses a resin in which vinyl chloride has been graft-polymerized onto a crosslinked double layer elastomer having an outer shell of an acrylic ester and a styrene core. In order that the resulting composition may acquire an excellent transparency, however, it is necessary to limit the acrylic ester content of the double layer elastomer to 44 to 48% by weight, but this amount is insufficient to fully develop the impact strength. It is difficult, moreover, to obtain from such a double layer elastomer composition a vinyl chloride resin composition excellent in surface gloss.

Under these circumstances, the present inventors conducted extensive research on compositions of elastomer polymers and graft copolymers, polymerization method and properties of the elastomer polymers and graft copolymers, and as a result, have found that a modifier resin having the same surface gloss as that of PVC and favorable resistance to both weathering and impact, while retaining good transparency, may be obtained by graft-polymerizing first methyl methacrylate and subsequently an aromatic vinyl monomer in the presence of a double layer acrylic elastomer latex formed by use of a polyfunctional crosslinking agent having one or more allyl groups in the molecule.

An object of this invention is to provide a vinyl chloride resin composition having favorable surface gloss and transparency as well as sufficient resistance to weathering and impact.

Other objects and advantages of this invention will become apparent from the following description.

According to this invention, there is provided a vinyl chloride resin composition excellent in surface gloss and transparency and resistant to weathering and impact, comprising 97 to 60 parts by weight of a vinyl chloride polymer and 3 to 40 parts by weight of a graft copolymer (B) obtained by emulsion-polymerizing a mixture of an aromatic vinyl monomer and a polyfunctional crosslinking agent having at least one allyl group, then polymerizing, in the presence of the resulting polymer latex, a mixture of an alkyl acrylate having 2 to 10 carbon atoms in the alkyl group and a polyfunctional crosslinking agent having at least one allyl group to form an acrylic elastomer (A) in the first stage, the proportions of said alkyl acrylate and said aromatic vinyl monomer being 50 to 70% by weight and 50 to 30% by weight, respectively, and the amount of said crosslinking agent used being 0.1 to 5 parts by weight in total per 100 parts by weight of both the alkyl acrylate and the aromatic vinyl monomer; and graftpolymerizing, in the presence of the resulting acrylic elastomer (A), first methyl methacrylate and subsequently an aromatic vinyl monomer in the second stage, the proportions of said methyl methacrylate and said aromatic vinyl monomer being 30 to 80% by weight and 70 to 20% by weight, respectively, and the total amount of said methyl methacrylate and said aromatic vinyl monomer used being 70 to 20 parts by weight per 30 to 80 parts by weight of said acrylic elastomer (A).

In order to prepare the graft copolymer (B) used in the present vinyl chloride resin composition, in the first stage, acrylic elastomer (A) is prepared by emulsion-polymerizing an aromatic vinyl monomer and a polyfunctional crosslinking agent having at least one allyl group and then polymerizing a mixture of an alkyl acrylate and the same polyfunctional crosslinking agent as above in the presence of the resulting polymer latex.

The aromatic vinyl monomers used are styrene and other related monomers such as, vinyltoluene, α-methylstyrene, chlorostyrene, bromostyrene, and the like. The alkyl acrylates for use include those having 2 to 10 carbon atoms in the alkyl group such as, for example, ethyl acrylate, propyl acrylate, butyl acrylate, isobutyl acrylate, hexyl acrylate, n-octyl acrylate, 2-ethylhexyl acrylate, etc. These monomers are used alone or in admixture.

The polyfunctional crosslinking agent should have one or more allyl groups in the molecule in order to improve transparency, surface gloss, and impact resistance. Such polyfunctional crosslinking agent having one or more allyl groups in the molecule include, for example, triallyl cyanurate, triallyl isocyanurate, allyl methacrylate, allyl acrylate, diallyl itaconate, and diallyl phthalate. Of these, allyl methacrylate and triallyl cyanurate are particularly preferred.

Crosslinking agents containing no ally group, such as divinylbenzene and diacrylate or dimethyacrylate esters of polyhydric alcohols, are less effective in improving transparency and surface gloss. The reason for this has not been elucidated as yet, but it seems that such crosslinking agents as diacrylate esters are effective in crosslinking styrene polymer, but since the degree of swelling of the double layer elastomer obtained by polymerizing an acrylic ester on the styrene polymer is high, the crosslinking of the layer of the acrylic ester polymer becomes insufficient with said crosslinking agents. When methyl methacrylate and an aromatic vinyl monomer are graft polymerized on said double layer elastomer, grafting reaction is not sufficiently caused as compared with the case where a polyfunctional crosslinking agent having allyl groups is used.

The amount of the aforesaid polyfunctional crosslinking agent having allyl groups used is 0.1 to 5 parts by weight per 100 parts by weight in total of the alkyl acrylate and aromatic vinyl monomer. If it is used in an amount of less than 0.1 part, the crosslinking efficiency becomes insignificant, while if the amount exceeds 5 parts, the resulting elastomer loses its elasticity to become brittle and unable to impart impact resistance to the vinyl chloride resin composition. The weight proportions of the polyfunctional crosslinking agent to the aromatic vinyl monomer and the alkyl acrylate are preferably 0.2 to 1.5 and 0.2 to 1.0, respectively. The above-noted crosslinking agent may be used in combination with a crosslinking agent having no allyl group, the amount of the latter being up to 0.2 part by weight per 100 parts by weight in total of the alkyl acrylate and aromatic vinyl monomer.

The emulsifier for use in preparing the acrylic elastomer (A) may be an ordinary surface active agent of the anionic, nonionic, or cationic type. Of these types, the anionic type is preferable in view of stability of the resulting polymer latex. The polymerization initiator to be used can be an ordinary water-soluble inorganic initiator such as a persulfate, perborate, or the like. These are used alone or in combination with a sulfite, hydrogensulfite, or thiosulfate to form redox systems. Further, redox systems, such as organic hydroperoxide-ferrous salt and organic hydroperoxide-sodium formaldehyde-sulfoxylate, and azo compounds may also be used.

The emulsion polymerization can be conducted at any temperature above the decomposition temperature of the initiator used, but preferably at 60° to 80° C in view of the polymerization time. Both the crosslink polymerizations may be carried out by adding the whole of the mixture of a polyfunctional crosslinking agent and monomer at one time or while continuously adding the whole or a part of the mixture. In view of stability of the polymerization and dissipation of the heat of polymerization, it is preferable to carry out the polymerization while continuously adding the said mixture. The particle diameter of the elastomer latex affects greatly the properties of the present vinyl chloride resin composition, because it determines the size of particles of the modifier dispersed in the vinyl chloride polymer. If the particle size of the modifier is too small, impact strength is not improved, while if it is too large, transparency is reduced. A preferable particle diameter of the elastomer latex is in the range from 0.07 to 0.25 $\mu$. In this way, there is obtained the acrylic elastomer (A) of a double layer structure with a core of a polymer formed from an aromatic vinyl monomer and the aforesaid polyfunctional crosslinking agent and an outer shell of a polymer formed from an alkyl acrylate and said polyfunctional crosslinking agent.

Although it is desirable for the transparency to regulate the composition of acrylic elastomer (A) to make the refractive index thereof as approximate as possible to that of the vinyl chloride polymer, yet said composition should be such that the elastomer may exhibit a sufficient elasticity for developing the desired impact strength. Since the transparency is affected also by the nature of the graft copolymer (B) obtained by use of the said elastomer, it is possible to maintain the transparency of vinyl chloride resin and improve other properties of the vinyl chloride resin composition by adjusting the overall composition of the graft copolymer (B) to the above-mentioned specific one. With an increased dominance of an alkyl acrylate in the composition of acrylic elastomer (A), the resulting vinyl chloride resin composition becomes higher in impact strength, but lower in transparency, whereas when an aromatic vinyl monomer becomes dominant, said resin composition gains in transparency, but loses its impact strength. To obtain a vinyl chloride resin composition, in which a proper balance is established between transparency and impact strength, the acrylic elastomer (A) should have such a composition that the alkyl acrylate content is 50 to 70 % by weight and the aromatic vinyl monomer content is 50 to 30 % by weight. Even when the composition of the elastomer is maintained within the above noted ranges, the impact resistance of the resin composition is not improved if there has been used an elastomer obtained by random copolymerization of an alkyl acrylate and an aromatic vinyl monomer or an elastomer with a core of an alkyl acrylate and an outer shell of an aromatic vinyl monomer.

In the second stage, a graft copolymer (B) is formed by graft-polymerizing first methyl methacrylate and subsequently an aromatic vinyl monomer in the respective specific ratios in the presence of the acrylic elastomer (A). A vinyl chloride resin composition excellent in surface gloss and transparency and favorable in weather resistance and impact resistance may be obtained only by use of the graft copolymer (B) mentioned above.

The graft copolymer (B) is obtained by the graft polymerization of 70 to 20 parts by weight of the monomers in the presence of 30 to 80 parts by weight (in terms of solids content) of the acrylic elastomer (A). If the elastomer is below 30 parts by weight, the graft copolymer becomes less effective in improving the impact strength of the vinyl chloride resin composition, and if it exceeds 80 parts by weight, difficulties will be encountered in the steps of coagulating and drying the graft copolymer and, moreover, a vinyl chloride resin composition with markedly inferior processability and reduced impact strength will result.

The present graft copolymer (B) is prepared by graft polymerization in two consecutive steps, first with 30 to 80 % by weight of methyl methacrylate, and subsequently with 70 to 20 % by weight of an aromatic vinyl monomer. The aromatic vinyl monomers for use are styrene, which is preferred, α-substituted styrenes, nucleus-substituted styrenes, and derivatives thereof, such as, vinyltoluene, α-methylstyrene, chlorostyrene, and the like. The higher the proportion of methyl methacrylate in grafting monomers, the lower the impact strengths and transparency, and the surface gloss of the sheeting is deteriorated, whereas the more the aromatic vinyl monomer, the lower the compatibility of the graft copolymer with a vinyl chloride polymer becomes, resulting in deterioration in impact strength and transparency. It is also possible to adopt a so-called three-step graft-polymerization procedure, wherein a portion of the methyl methacrylate is graft-polymerized in the third step after completion of graft polymerization of the aromatic vinyl monomer in the second step.

Both graft polymerizations are each allowed to proceed by adding the monomer all at one time or continuously or intermittently. If graft polymerization is allowed to proceed by adding simultaneously methyl methacrylate and the aromatic vinyl monomer, the vinyl chloride resin composition is deteriorated in transparency, surface characteristics of the sheeting and weather resistance. If, on the other hand, graft polymerization is carried out first with an aromatic vinyl monomer and then with methyl methacrylate, there appear a great number of unfused polymer particles (fish-eyes) in the surface of the sheeting made from the vinyl chloride resin composition, injuring the surface characteristics of the sheeting.

The graft polymerization can be carried out either in succession to formation of the elastomer (A) or separately in another reactor, under customary conditions for emulsion polymerization with or without the addition of an initiator, chain-transfer, crosslinking agent, etc. These additives may be the same as or different from those used in preparing the elastomer (A). The latex of graft copolymer (B) thus formed is subjected to, for example, coagulation by salting out, washing, drying, and preferably pulverizing.

The present resin composition comprises 3 to 40 parts by weight of the graft copolymer (B) thus formed and 97 to 60 parts by weight of a vinyl chloride polymer. Suitable vinyl chloride polymers include not only polyvinyl chloride but also vinyl chloride copolymers containing 70 % by weight or more of vinyl chloride. Suitable comonomers are, for example, vinyl bromide, vinylidene chloride, vinyl acetate, acrylic esters, and methacrylic esters.

The graft copolymer (B) and the vinyl chloride polymer, both preferably in the form of powder, are mixed by means of, for example, a ribbon blender, Henschel mixer, or the like, and molded by means of a known milling machine such as, a mixing roll, Banbury mixer, extruder, or injection machine. If necessary, customary stabilizers, plasticizers, processing aids, and colorants may be added during mixing operation. If the amount of graft copolymer (B) in the final composition is less than 3 parts by weight, the impact strength is low, while if the amount exceeds 40 parts by weight, excellent properties of the vinyl chloride polymer are lost and, moreover, the excessive addition is uneconomical.

In the following Examples, all parts and percentages are by weight unless otherwise specified.

EXAMPLE 1

A. Preparation of acrylic elastomer latex.

In 180 parts of ion-exchanged water, which has been treated with nitrogen to replace the air and placed in a reactor, were dissolved 0.5 part of dioctyl sulfosuccinate as an emulsifier, and 0.3 part of potassium persulfate. To the resulting aqueous solution maintained at 70° C, were added dropwise over a period of 60 minutes a liquid monomer mixture of 47.5 parts of styrene and 1.0 part of allyl methacrylate to allow the polymerization to proceed. After completion of the dropwise addition, the reaction mixture was maintained at the same temperature for one hour to complete the polymerization. Conversion was 95 % and the average particle diameter of the resulting latex was 0.08 $\mu$.

To the thus formed latex, maintained at 70° C and without addition of a fresh emulsifier, was added dropwise over a period of 60 minutes a mixed monomer solution comprising 10 parts of ion-exchanged water, 0.3 part of potassium persulfate, 52.5 parts of n-butyl acrylate, and 0.5 part of allyl methacrylate to allow the polymerization to proceed. After completion of the dropwise addition, the reaction mixture was further maintained at the same temperature for one hour to complete the polymerization. Conversion was 96 % and the resulting elastomer latex had an average particle diameter of 0.115 $\mu$, a gel content of 88.5 %, and a degree of swelling of 6.1.

The gel content and degree of swelling of the elastomer latex were determined by drying a sample of latex in a Petri dish, immersing a portion, Wo (g), of the dried latex in methyl ethyl ketone at 30° C for 48 hours, and measuring the weight, $W_1$ (g), of swollen sample and the weight, $W_2$ (g), of bone dry sample.

$$\text{Gel content (\%)} = \frac{W_2}{W_0} \times 100$$

$$\text{Degree of swelling} = \frac{W_1}{W_2}$$

B. Preparation of graft copolymer.

Into a reactor were charged 70 parts (in terms of solids) of the acrylic elastomer latex obtained in (A), 200 parts of water (total of the water in latex plus the water used to dissolve potassium persulfate), and 0.3 part of potassium persulfate. To the resulting mixture, maintained at 70° C, was added dropwise over a period of 30 minutes 15 parts of methyl methacrylate to allow the polymerization to proceed. After completion of the dropwise addition, the reaction mixture was further maintained at the same temperature for one hour to complete the polymerization. To the polymerization mixture was added dropwise over a period of 30 minutes 15 parts of styrene to allow the polymerization to proceed. After completion of the dropwise addition, the polymerization mixture was kept for a further 10 minutes to complete the polymerization. Conversion was 96 % or higher and the resulting graft copolymer latex had an average particle diameter of 0.145 $\mu$.

The thus obtained graft copolymer latex was coagulated by salting-out with an aqueous aluminum chloride solution, washed, dehydrated, and dried to obtain a resin in the powder form.

C. Preparation of vinyl chloride resin composition.

Using a Henschel mixer, 10 parts of the graft copolymer obtained in (B), 100 parts of a vinyl chloride polymer having an average polymerization degree of 700, 3.0 parts of dibutyltin maleate, 2.0 parts of dioctyl phthalate, and 1.5 parts of a lubricant were mixed until the temperature reached 115° C to obtain a uniform mixture. The resulting vinyl chloride resin composition was milled for 5 minutes by means of a mixing roll maintained at 170° C, and then compression-molded at 180° C, under a pressure of 150 kg/cm², for 5 minutes to prepare test specimens for testing impact strength, light transmittance, and haze. The impact strength was measured by the method specified in JIS K 6745 and the light transmittance and haze were measured by the methods specified in JIS K 6714 (thickness of specimen: 2 mm).

Other acrylic elastomer latices were prepared in the same manner as in (A), except that styrene and n-butyl acrylate were used in the proportions shown in Table 1. Using these latices, vinyl chloride resin compositions and test specimens were prepared by the same procedures as used in (B) and (C).

Compositions of the acrylic elastomers and properties of the vinyl chloride resin compositions obtained therefrom were as shown in Table 1. In Table 1, St stands for styrene and BuA for n-butyl acrylate.

Table 1

| Run No. | Composition of elastomer St, % | BuA, % | Charpy impact strength, kg. cm/cm² | Vinyl chloride resin composition Total transmittance, % | Haze, % |
|---|---|---|---|---|---|
| 1 (comparison) | 0 | 100 | 9.5 | 20.2 | 95.9 |
| 2 (this invention) | 30 | 70 | 20.3 | 72.5 | 28.9 |
| 3 (this invention) | 40 | 60 | 19.0 | 79.1 | 18.7 |
| 4 (this invention) | 47.5 | 52.5 | 17.5 | 82.8 | 13.1 |
| 5 (Comparison) | 55 | 45 | 7.5 | 84.5 | 12.7 |
| 6 (Comparison) | 70 | 30 | 5.4 | 86.4 | 10.1 |

As is apparent from Table 1, with an increase in styrene content, transparency is improved, while impact resistance is decreased; with an increase in n-butyl acrylate content, impact resistance is improved, while transparency is decreased. No resin composition with well-balanced properties was obtained from the elastomers having compositions not falling within the ranges herein specified.

EXAMPLE 2

Two types of acrylic elastomers were prepared in the same manner as in Example 1 — (A), except that styrene and n-butyl acrylate were simultaneously random-copolymerized or n-butyl acrylate was first polymerized to form the core and then styrene was polymerized to form the shell. Thereafter the same procedure as in Example 1 was repeated to obtain vinyl chloride resin compositions having the properties shown in Table 2. In Table 2, the temperatures given at the top of each column were those at which Charpy impact tests were carried out.

Table 2

| Run No. | Composition of elastomer Core | Shell | Vinyl chloride resin composition Charpy impact strength, kg . cm/cm² 20° C | 0° C | −10° C | −20° C |
|---|---|---|---|---|---|---|
| 4 (this invention) | 47.5 (St) | 52.5 (BuA) | 17.5 | 13.8 | 9.5 | 7.1 |
| 7 (comparison) | 47.5/52.5 (St/BuA) | — | 14.3 | 7.3 | 5.0 | 3.5 |
| 8 (comparison) | 52.5 (BuA) | 47.5 (St) | 5.4 | 3.6 | 3.6 | 3.4 |

As is apparent from Table 2, a high impact strength was developed by use of the present elastomer of double layer structure having a core of an aromatic vinyl monomer and a shell of an alkyl acrylate, whereas only a low impact strength was attained when an elastomer of reversed double layer structure or an elastomer of random copolymer was used.

EXAMPLE 3

Several acrylic elastomers were prepared in the same manner as in Example 1 — (A), except that types and quantities of the crosslinking agent were varied as shown in Table 3, provided that the proportion of the crosslinking agent to styrene was the same as that to n-butyl acrylate. In Table 3, there are shown degrees of swelling and gel contents of the resulting elastomers and properties of the vinyl chloride resin compositions obtained in the same manner as in Example 1. In Table 3, TAIC stands for triallyl isocyanurate, AA for allyl acrylate, AMA for allyl methacrylate, DVB for divinylbenzene, and DEGDA for diethylene glycol diacrylate, and the quantity (in parts) of the crosslinking agent is based on 100 parts in total of the monomers.

Table 3

| Run No. | Elastomer Crosslinking agent, parts | | Swelling degree | Gel content, % | Vinyl chloride resin composition transmittance | Charpy impact strength, kg . cm/cm² |
|---|---|---|---|---|---|---|
| 9 (this invention) | TAIC | 1 | 8.4 | 89.1 | 15.4 | 79.5 | 17.9 |
| 10 (this invention) | AA | 1 | 6.0 | 89.0 | 16.5 | 81.4 | 13.9 |
| 11 (this invention) | AMA | 0.1 | 25.7 | 74.1 | 8.0 | 79.3 | 24.5 |
| 12 (this invention) | AMA | 0.5 | 8.4 | 85.0 | 18.7 | 82.5 | 18.7 |
| 13 (this invention) | AMA | 0.1 | 6.1 | 88.5 | 17.5 | 82.8 | 13.1 |
| 14 (this invention) | AMA | 2.0 | 5.5 | 90.0 | 15.8 | 82.3 | 19.6 |
| 15 (this invention) | AMA | 4.5 | 94.0 | 12.0 | 81.5 | 22.5 | |
| 16 (comparison) | AMA | 0 | ∞ | 0 | 2.7 | 40.0 | 80.4 |
| 17 (comparison) | AMA | 10.0 | 3.6 | 97.5 | 5.3 | 70.1 | 33.2 |
| 18 (comparison) | DVB | 1.0 | 17.2 | 85 | 14.5 | 68.1 | 27.0 |
| 19 (comparison) | DEGDA | 1.0 | 19.0 | 75 | 12.8 | 52.0 | 64.5 |

EXAMPLE 4

Acrylic elastomers were prepared in the same manner as in Example 1 — (A), except that 40 parts of styrene and 60 parts of various alkyl acrylates, as shown in Table 4, were used. Properties of the vinyl chloride resin compositions obtained in the same way as in Example 1 were as shown in Table 4.

Table 4

| Run No. | Alkyl * acrylate used in preparing elastomer | Vinyl chloride resin composition | | |
|---|---|---|---|---|
| | | Charpy impact strength, kg · cm/cm² | Total transmittance, % | Haze, % |
| 20 (comparison) | MA | 6.5 | 80.1 | 17.6 |
| 21 (this invention) | EA | 15.7 | 79.0 | 18.3 |
| 22 (this invention) | 2EHA | 19.8 | 79.3 | 18.5 |

Note:
* MA methyl acrylate
EA ethyl acrylate
2EHA 2-ethylhexyl acrylate

EXAMPLE 5

Graft copolymers were prepared in a manner similar to that in Example 1 — (B) by using the elastomer latex prepared in Example 1 — (A) in varying proportions to monomers to be grafted, the total of said elastomer latex (in terms of solids), styrene (St), and methyl methacrylate (MMA) being 100 parts. Properties of the vinyl chloride resin compositions prepared in a manner similar to that in Example 1 — (C) by use of the resulting graft copolymers were as shown in Table 5.

40-mm φ extruder provided with a T die to form sheetings, 0.3 mm in thickness, which were evaluated for surface characteristics and transparency. Each of the sheetings was compression-molded at 180° C, under a pressure of 150 kg/cm², for 5 minutes to obtain molded test specimens (press sheet) for testing impact strength, transparency, and haze. The test results were as shown in Table 6.

For comparision, a vinyl-chloride-grafted polymer was prepared polymerizing only vinyl chloride in place of styrene and methyl methacrylate. A resin composition obtained by use of said vinyl-chloride-grafted polymer was tested in the same way as mentioned above and the results obtained are also shown in Table 6.

The vinyl-chloride-grafted polymer was prepared in the following way. In an autoclave, after having been flushed with nitrogen to replace the air, were charged 70 parts (in terms of solids content) of the elastomer latex obtained in Example 1 — (A), 200 parts of ion-exchanged water, 0.5 part of potassium persulfate, 0.05 part of disodium hydrogenphosphate, and 30 parts of vinyl chloride. The autoclave was heated to and maintained at 70° C. When the pressure reached 0.7 kg/cm², the autoclave was cooled and the unreacted vinyl chloride was purged. The reaction mixture was treated in the same manner as in Example 1 — (B) to obtain a resin in the powder form.

Table 6

| Run No. | Elastomer, parts in terms of solids | Monomer grafted | | Vinyl chloride resin composition | | | | | | |
|---|---|---|---|---|---|---|---|---|---|---|
| | | | | Surface characteristics of sheeting | | | | Press sheet | | |
| | | First step, parts | Second step, parts | F.E. | Gloss | Total[1] transmittance, % | Haze[1] % | Charpy impact strength, kg · cm/cm² | Total[2] transmittance, % | Haze,[2] % |
| 4 (this invention | 70 | MMA 15 | St 15 | ◎ | ◎ | 91.0 | 7.4 | 18.1 | 82.8 | 13.1 |
| 27 (comparison) | 70 | MMA/St 15/15 | — | ◎ | O-Δ | 80.4 | 21.6 | 11.4 | 73.4 | 40.5 |
| 28 (comparison) | 70 | St 15 | MMA 15 | Δ-X | O | 89.5 | 8.3 | 17.5 | 82.5 | 20.1 |
| 29 (comparison) | 70 | VCl | — | Δ | O-Δ | 87.5 | 13.5 | 13.5 | 75.5 | 31.5 |

Note:
Rating of surface characteristics ◎ > O > O-Δ > Δ > Δ-X
F.E. (fish-eye): Unfused polymer particles in the surface of sheeting.
[1] Thickness of sheeting was 0.3 mm.
[2] Thickness of sheeting was 2 mm.

Table 5

| Run No. | Elastomer, parts in terms of solids | Monomer grafted | | Vinyl chloride resin composition | | |
|---|---|---|---|---|---|---|
| | | MMA, parts | St, parts | Charpy impact strength, kg · cm/cm² | Total transmittance, % | Haze, % |
| 23 (comparison) | 10 | 45 | 45 | 3.2 | 88.1 | 19.8 |
| 24 (this invention) | 30 | 35 | 35 | 6.3 | 85.2 | 17.5 |
| 25 (this invention) | 50 | 25 | 25 | 12.4 | 83.6 | 15.2 |
| 4 (this invention) | 70 | 15 | 15 | 17.5 | 82.8 | 13.1 |
| 26 (this invention) | 80 | 10 | 10 | 19.2 | 80.5 | 15.0 |

EXAMPLE 6

Graft copolymers were prepared in a manner similar to that in Example 1 — (B) by using 70 parts (in terms of solids content) of the elastomer latex formed in Example 1 — (A) and random-copolymerization styrene (St) and methyl methacrylate (MMA), or graft-copolymerizing stryene first and then methyl methyacrylate. Vinyl chloride resin compositions were prepared in a manner similar to that in Example 1 by using the thus obtained graft copolymers. The resulting resin compositions were extrusion-molded by means of a It was unexpected that as seen from Table 6, even when two grafted polymers were the same in graft composition and refractive index, they could be markedly different from each other in transparency, depending upon the method of graft polymerization. Although a resin composition excellent in transparency and impact strength was obtained by a two-step graft polymerization, the transparency and surface characteristics were further improved by graft-polymerizing first methyl methacrylate and then styrene according to this invention. It was also found that when vinyl chloride having nearly the same refractive index as that of a mixture (1

: 1) of methyl methacrylate and styrene was graft-polymerized, there is obtained a resin composition markedly inferior to the present composition in transparency and surface characteristics of the sheeting.

EXAMPLE 7

A graft copolymer was prepared, using 70 parts (in terms of solids content) of the elastomer latex obtained in Example 1 — (A) in the same manner as in Example 1 — (B), except that after graft-polymerizing (15 — x) parts of methyl methacrylate in the first stage and 15 parts of styrene in the second stage, x parts of methyl methacrylate was added, in the third step, dropwise over a period of 30 minutes, while allowing the polymerization to proceed, and thereafter kept for 60 minutes to complete the polymerization. By use of the thus formed graft copolymer, a vinyl chloride resin composition was obtained in the same manner as in Example 1. Similar resin compositions with elastomers of varying graft compositions were prepared. The results of tests conducted in the same manner as in Example 6 were as shown in Table 7.

strength is reduced, while when the proportion of methyl methacrylate is too large in proportion, a great number of fish-eyes are formed in the surface of sheeting, adversely affecting the surface characteristics.

EXAMPLE 9

An elastomer latex was prepared in the same manner as in Example 1 — (A), except that 40 parts of styrene and 60 parts of n-butyl acrylate were used. By using the resulting elastomer latex, graft polymers were prepared in the same manner as in Example 1 — (B), except that 40 % of the grafted monomers were methyl methacrylate and 60 % were styrene or, for comparison, vinyl chloride alone was grafted. The properties of the vinyl chloride resin compositions obtained by use of the above graft polymers in the same manner as in Example 1 — (C) were as shown in Table 9.

Table 7

| Run No. | Elastomer, parts in terms of solids | Monomer grafted, parts | | | Vinyl chloride resin composition | | | | | | |
|---|---|---|---|---|---|---|---|---|---|---|---|
| | | 1st step MMA | 2nd step St | 3rd step MMA | Surface characteristics of sheeting | | | | Press sheet | | |
| | | | | | F.E.* | Gloss* | trans-mittance, % | Haze, 1) % | Total 1) impact strength, kg. cm/cm² | Charpy trans-mittance, % | Haze, 2) % |
| 4 (this invention) | 70 | 15 | 15 | 0 | ◎ | ◎ | 91.0 | 7.4 | 18.1 | 82.8 | 13.1 |
| 30 ( " ) | 70 | 10 | 15 | 5 | ◎ | ◎ | 91.3 | 7.3 | 18.3 | 83.0 | 12.9 |
| 31 ( " ) | 70 | 6 | 15 | 9 | ◎ | ◎ | 90.6 | 7.6 | 18.5 | 82.4 | 14.7 |
| 32 ( " ) | 70 | 3 | 15 | 12 | ○ | ◎ | 90.1 | 8.0 | 18.0 | 82.7 | 16.0 |
| 28 (comparison) | 70 | 0 | 15 | 15 | Δ-X | ○ | 89.5 | 8.3 | 17.5 | 82.5 | 20.1 |

Note:
*Rating is the same as in Table 6.
1) and 2) are the same as in Table 6.

As is apparent from Table 7, a vinyl chloride resin composition with excellent surface characteristics may be obtained also when three-step graft polymerization was adopted.

EXAMPLE 8

Vinyl chloride resin compositions were prepared by use of 70 parts (in terms of solids content) of the elastomer latex obtained in Example 1 — (A) in the same manner as in Example 1, except that methyl methacrylate and styrene were used in varying proportions in graft polymerization. In Table 8 are shown results of evaluation conducted on the sheetings and test specimens prepared from each resin composition in the same manner as in Example 5.

| Run No. | Monomer grafted | strength, kg.cm/cm² | tance, (%) | Haze, % |
|---|---|---|---|---|
| 37 (this invention) | MMA 40  St 60 | 19.0 | 80.5 | 16.4 |
| 38 (Comparison) | VCl 100 | 14.0 | 68.4 | 35.5 |

Note: VCl refers to vinyl chloride.

As is apparent from Table 9, in case the alkyl acrylate content of the elastomer is high, a resin composition obtained by use of a polymer formed by grafting vinyl chloride onto such an elastomer showed a reduction in transparency (cf. Run No. 29 in Table 6), whereas the present composition was excellent in transparency and impact resistance.

Table 8

| Run No. | Monomer grafted | | Vinyl chloride resin composition | | | | |
|---|---|---|---|---|---|---|---|
| | 1st step MMA, % | 2nd step St, % | surface characteristics of sheeting | | Charpy impact strength, kg.cm/cm² | Total trans-mittance, % | Haze, % |
| | | | F.E.* | Gloss* | | | |
| 33 (comparison) | 20 | 80 | ◎ | ○ | 6.4 | 26.3 | 96.3 |
| 34 (this invention) | 30 | 70 | ◎ | ◎-○ | 12.7 | 77.4 | 27.3 |
| 1 ( " ) | 50 | 50 | ◎ | ◎ | 18.1 | 82.8 | 13.1 |
| 35 ( " ) | 80 | 20 | ◎-○ | ◎ | 14.5 | 78.0 | 20.9 |
| 36 (comparison) | 100 | 0 | X | ◎-○ | 10.0 | 73.3 | 25.7 |

Note:
*Rating is the same as in Table 6.

As is apparent from Table 8, when the proportion of styrene in grafted monomers is too large, the transparency becomes markedly inferior and also the impact

COMPARATIVE EXAMPLE

Vinyl chloride resin compositions were prepared in the same manner as in Example 1 — (C), except that commercial modifiers for vinyl chloride resins, i.e. methyl methacrylate-butadiene-styrene resin (MBS) and chlorinated polyethylene (ClPE), were used in place of the graft copolymer prepared in Example 1 — (B). In Table 10 are shown properties of these resin compositions, together with those of the vinyl chloride resin (PVC) having an average polymerization degree of 700 which had been used in Example 1 — (C), and of the present resin composition. Weather resistance was expressed in terms of Charpy impact strength of the test specimen which had been treated by Weather-O-meter (Toyo Rika Co., type WF-II).

Table 10

| Modifier | Surface characteristics of sheeting | | | Press sheet | | Weather resistance (charpy) impact strength, kg . cm/cm$^2$ | | | |
|---|---|---|---|---|---|---|---|---|---|
| | Total [1] trans-mittance, % | Haze, [1] % | Gloss* | trans-mittance, % | Haze, [2] % | 0 hour | 100 hours | 500 hours | 1,000 hours |
| Graft copolymer of Example 1 - (B) | 91.0 | 7.4 | ◎ | 82.8 | 13.1 | 18.1 | 13.5 | 12.5 | 10.4 |
| MBS | 90.0 | 11.4 | ◎ | 82.6 | 16.1 | 22.5 | 3.1 | 1.8 | 2.1 |
| ClPE | 69.2 | 53.9 | X | 28.5 | 95.0 | 12.0 | 10.9 | 3.0 | 2.6 |
| None | 91.7 | 7.1 | ◎ | 85.3 | 11.7 | 2.9 | 2.8 | 3.2 | 3.0 |

Note:
*Rating is the same as in Table 6.
[1] and [2] are the same as in Table 6.

As is apparent from Table 10, the present vinyl chloride resin composition was capable of yielding a sheeting having such an excellent surface gloss as had never been attained by use of an acrylic elastomer and was excellent also in transparency and impact strength. Weather resistance of the present composition was also excellent, as evaluated from the retention of impact strength after 1,000 hours of exposure.

What is claimed is:

1. A transparent vinyl chloride resin composition excellent in surface gloss and resistant to weathering and impact, comprising 97 to 60 parts by weight of a vinyl chloride polymer and 3 to 40 parts by weight of a graft copolymer (B) obtained by emulsion-polymerizing a mixture of an aromatic vinyl monomer and a polyfunctional crosslinking agent having at least one allyl group, then polymerizing, in the presence of the resulting polymer latex, a mixture of an alkyl acrylate having 2 to 10 carbon atoms in the alkyl group and a polyfunctional crosslinking agent having at least one allyl group to form an acrylic elastomer (A) in the first stage, the proportions of said alkyl acrylate and said aromatic vinyl monomer being 50 to 70 % by weight and 50 to 30 % by weight, respectively, and the amount of said crosslinking agent used being 0.1 to 5 parts by weight in total per 100 parts by weight of the sum of said alkyl acrylate and said aromatic vinyl monomer; and graft-polymerizing, in the presence of the resulting acrylic elastomer (A), first methyl methacrylate and subsequently an aromatic vinyl monomer in the second stage, the proportions of said methyl methacrylate and said aromatic vinyl monomer being 30 to 80 % by weight and 70 to 20 % by weight, respectively, and the total amount of said methyl methacrylate and said aromatic vinyl monomer used being 70 to 20 parts by weight per 30 to 80 parts by weight of said acrylic elastomer (A).

2. A vinyl chloride resin composition according to claim 1, wherein the graft copolymer (B) is obtained by graft-polymerizing, in the presence of the elastomer (A), first a portion of the methyl methacrylate, then the aromatic vinyl monomer and thirdly the remaining methyl methacrylate.

3. A vinyl chloride resin composition according to claim 1, wherein the alkyl acrylate in the acrylic elastomer (A) is n-butyl acrylate, n-octyl acrylate, or 2-ethylhexyl acrylate.

4. A vinyl chloride resin composition according to claim 1, wherein the polyfunctional crosslinking agent having at least one allyl group in the molecule and used in the acrylic elastomer (A) is allyl methacrylate, triallyl cyanurate, or triallyl isocyanurate, the total amount used thereof is 0.4 to 2.5 parts by weight, and the weight proportions of the polyfunctional crosslinking agent to the aromatic vinyl monomer and the alkyl acrylate are 0.2 to 1.5 and 0.2 to 1.0, respectively.

5. A vinyl chloride resin composition according to claim 1, wherein 40 to 20 parts by weight in total of the methyl methacrylate and the aromatic vinyl monomer are grafted onto 60 to 80 parts by weight of the acrylic elastomer (A) to form the graft copolymer (B), the proportions of said methyl methacrylate and said aromatic vinyl monomer being 40 to 60% by weight and 60 to 40 % by weight, respectively.

* * * * *

UNITED STATES PATENT OFFICE
CERTIFICATE OF CORRECTION

Patent No. 4,035,443　　　　　　　　Dated July 12, 1977

Inventor(s) FUMIO IDE ET AL

It is certified that error appears in the above-identified patent and that said Letters Patent are hereby corrected as shown below:

Under "Foreign Application Priority Data", following the line designated as "[30]", please delete "50-148851" and insert therefor --49-148851--.

Signed and Sealed this

Fifteenth Day of November 1977

[SEAL]

Attest:

RUTH C. MASON　　　　　　　　LUTRELLE F. PARKER
Attesting Officer　　　　　　Acting Commissioner of Patents and Trademarks